US012675969B2

(12) United States Patent
Sun et al.

(10) Patent No.: US 12,675,969 B2
(45) Date of Patent: Jul. 7, 2026

(54) IMAGE ACQUISITION METHOD AND SYSTEM, AND DISPLAY PANEL

(71) Applicant: Hefei Visionox Technology Co., Ltd., Hefei (CN)

(72) Inventors: Dandan Sun, Hefei (CN); Lei An, Hefei (CN); Nianze Chen, Hefei (CN); Panpan Du, Hefei (CN); Yingying Hou, Hefei (CN); Alei Liu, Hefei (CN)

(73) Assignee: HEFEI VISIONOX TECHNOLOGY CO., LTD, Hefei (CN)

( * ) Notice: Subject to any disclaimer, the term of this patent is extended or adjusted under 35 U.S.C. 154(b) by 547 days.

(21) Appl. No.: 17/980,022

(22) Filed: Nov. 3, 2022

(65) Prior Publication Data
US 2023/0056792 A1      Feb. 23, 2023

Related U.S. Application Data

(63) Continuation-in-part of application No. PCT/CN2021/095269, filed on May 21, 2021.

(30) Foreign Application Priority Data

Aug. 20, 2020    (CN) ......................... 202010844472.0

(51) Int. Cl.
*G06V 10/60* (2022.01)
*G06T 5/20* (2006.01)
(Continued)

(52) U.S. Cl.
CPC ................ *G06V 10/60* (2022.01); *G06T 5/20* (2013.01); *G06T 5/70* (2024.01); *G06T 7/136* (2017.01);
(Continued)

(58) Field of Classification Search
CPC ........ G06V 10/60; G06V 10/16; G06V 10/56; G06V 10/762; G06V 10/44; G06V 10/40;
(Continued)

(56) References Cited

U.S. PATENT DOCUMENTS

| | | | |
|---|---|---|---|
| 2017/0230585 A1* | 8/2017 | Nash | ...................... H04N 23/69 |
| 2018/0082454 A1 | 3/2018 | Sahu et al. | |
| 2018/0376059 A1* | 12/2018 | Cantero Clares | .... H04N 23/698 |

FOREIGN PATENT DOCUMENTS

| | | |
|---|---|---|
| CN | 104966090 A | 10/2015 |
| CN | 105872393 A | 8/2016 |

(Continued)

OTHER PUBLICATIONS

A. Kumar and S. S. Sodhi, "Comparative Analysis of Gaussian Filter, Median Filter and Denoise Autoenocoder," 2020 7th International Conference on Computing for Sustainable Global Development (INDIACom), New Delhi, India, 2020, pp. 45-51, doi: 10.23919/INDIACom49435.2020.9083712 (Year: 2020).*

(Continued)

*Primary Examiner* — Matthew C Bella
*Assistant Examiner* — Janice E. Vaz
(74) *Attorney, Agent, or Firm* — Maier & Maier, PLLC

(57) ABSTRACT

An image acquisition method. N images of an object to be shot are acquired. The N images are shot by N shooting devices. Shooting fields of view of the N shooting devices are different from each other. The N images are in one-to-one correspondence with the N shooting devices. Feature extraction is performed on the N images to obtain M features of the N images. M is an integer multiple of N. The M features include M/N types of features.

10 Claims, 4 Drawing Sheets

(51) Int. Cl.

| | |
|---|---|
| *G06T 5/70* | (2024.01) |
| *G06T 7/136* | (2017.01) |
| *G06V 10/10* | (2022.01) |
| *G06V 10/56* | (2022.01) |
| *G06V 10/762* | (2022.01) |
| *G09G 3/00* | (2006.01) |

(52) U.S. Cl.

CPC .............. *G06V 10/16* (2022.01); *G06V 10/56* (2022.01); *G06V 10/762* (2022.01); *G09G 3/00* (2013.01)

(58) Field of Classification Search

CPC .. G06T 5/20; G06T 5/70; G06T 7/136; G06T 5/50; G06T 2207/20212; G06T 2207/20221; G06T 2207/20216; G06T 2207/20224; G09G 2320/0233; G09G 2320/0242; H04N 25/41; H04N 23/90

See application file for complete search history.

(56) References Cited

FOREIGN PATENT DOCUMENTS

| | | | | |
|---|---|---|---|---|
| CN | 108205801 | A | 6/2018 | |
| CN | 108769550 | A | 11/2018 | |
| CN | 109120858 | A | 1/2019 | |
| CN | 109688334 | A | 4/2019 | |
| CN | 109981844 | A | 7/2019 | |
| CN | 110097007 | A | 8/2019 | |
| CN | 110516586 | A | * 11/2019 | ............. G06F 18/22 |
| CN | 110866896 | A | 3/2020 | |
| CN | 210578801 | U | 5/2020 | |
| CN | 111988540 | A | 11/2020 | |
| JP | 2010130408 | A | 6/2010 | |
| JP | 2014186580 | A | 10/2014 | |

OTHER PUBLICATIONS

Z. Wei, S. Dai and C. Lin, "Research on adaptive fusion algorithm for image stitching," 2017 International Symposium on Intelligent Signal Processing and Communication Systems (ISPACS), Xiamen, China, 2017, pp. 270-274, doi: 10.1109/ISPACS.2017.8266487. (Year: 2017).*

A. Kumar and S. S. Sodhi, "Comparative Analysis of Gaussian Filter, Median Filter and Denoise Autoenocoder," 2020 7th International Conference on Computing for Sustainable Global Development, New Delhi, India, 2020, pp. 45-51, doi: 10.23919/INDIACom49435.2020.9083712 (Year: 2020).*

P. Roy, S. Dutta, N. Dey, G. Dey, S. Chakraborty and R. Ray, "Adaptive thresholding: A comparative study," 2014 International Conference on Control, Instrumentation, Communication and Computational Technologies (ICCICCT), Kanyakumari, India, 2014, pp. 1182-1186, doi: 10.1109/ICCICCT.2014.6993140 (Year: 2014).*

J. Gao, S. J. Kim and M. S. Brown, "Constructing image panoramas using dual-homography warping," CVPR 2011, Colorado Springs, CO, USA, 2011, pp. 49-56, doi: 10.1109/CVPR.2011.5995433 (Year: 2011).*

International Search Report mailed Jul. 30, 2021, in corresponding International Application No. PCT/CN2021/095269, 6 pages (with English Translation).

The First Office Action dated Jan. 30, 2022, in corresponding Chinese Application No. 202010844472.0,17 pages (with English Translation).

Office Action issued on Jun. 27, 2025, in corresponding Korean Application No. 10-2022-7040097, 27 pages.

* cited by examiner

100

200

IMAGE ACQUISITION METHOD AND SYSTEM, AND DISPLAY PANEL

CROSS REFERENCE TO RELATED APPLICATIONS

The present disclosure is a continuation in part of PCT Application No. PCT/CN2021/095269, entitled "IMAGE ACQUISITION METHOD AND SYSTEM, AND DISPLAY PANEL" filed May 21, 2021, which claims priority to the Chinese Patent Application No. 202010844472.0, entitled "IMAGE ACQUISITION METHOD AND SYSTEM, AND DISPLAY PANEL" filed Aug. 20, 2020, each of which is incorporated herein in its entirety by reference.

TECHNICAL FIELD

Embodiments described in the present disclosure relate to the technical field of display, and more specifically to an image acquisition method and system, and a display panel.

BACKGROUND

Current flat display panels such as a liquid crystal display (Liquid Crystal Display, LCD), an organic light emitting display (Organic Light Emitting Display, OLED) and a display panel using a light emitting diode (Light Emitting Diode, LED) are advantaged in terms of high-quality image, power-saving, thin screen body and extensive scope of application. Therefore, the flat display panels are widely applied to various consumer electronics such as a mobile phone, a television, a personal digital assistant, a digital camera, a laptop and a desktop computer, and become the mainstream display panels. However, current display panels need to be improved in quality.

SUMMARY

An objective of some embodiments of the present disclosure is to provide an image acquisition method, an image acquisition device and a computer-readable storage medium that are able to improve shooting performance of a display device.

In order to address the above technical problem, some embodiments of the present disclosure provide an image acquisition method. The image acquisition method includes: acquiring N images of an object to be shot, where N is an integer greater than 1, the N images are shot by N shooting devices, shooting fields of view of the N shooting devices are different from each other, and the N images are in one-to-one correspondence with the N shooting devices; performing feature extraction on the N images to obtain M features of the N images, where M is an integer multiple of N, and the M features include M/N types of features; identifying and comparing features having a same type in the M features to obtain M/N target features, wherein types of the M/N target features are different from each other; and obtaining a target image of the object to be shot according to the M/N target features.

Correspondingly, some embodiments of the present disclosure further provide an image acquisition system including an acquisition device, an extraction device, an identification device and a processing device. The acquisition device is configured to acquire N images, where N is an integer greater than 1, the N images are shot by N shooting devices, shooting fields of view of the N shooting devices are different from each other, and the N images are in one-to-one correspondence with the N shooting devices. The extraction device is configured to perform feature extraction on the N images to obtain M features of the N images, where M is an integer multiple of N, and the M features include M/N types of features. The identification device is configured to identify and compare features having a same type in the M features to obtain M/N target features, where types of the M/N target features are different from each other. The processing device is configured to obtain a target image of the object to be shot according to the M/N target features.

Correspondingly, some embodiments of the present disclosure provide a display panel. The display panel includes a screen body, at least one processor provided within the screen body, and a memory in communication connection with the at least one processor. The memory stores an instruction executable by the at least one processor. The instruction is executed by the at least one processor so that the least one processor is able to execute the aforementioned image acquisition method.

The present disclosure is advantageous as follows. In response to a single shooting device being used to shoot an image, a light acquisition region of the single shooting device is small. This can by no means ensure acquisition of light satisfying shooting requirement of the shooting device, resulting in undesirable final images obtained through shooting. In some embodiments of the present disclosure, however, N images of an object to be shot are acquired, the N images shot by means of N shooting devices. The N shooting devices are all provided in a shooting region of the display device, so that the light acquisition region of the display device is larger. In this way, a condition is avoided where a small light acquisition region results in impacted image condition of the target image subsequently obtained. Besides, features having a same type of features are identified and compared among the M features to obtain M/N target features, the M features including M/N types of features. That is, a target feature (a number of target features of each type of features is 1) having optimal performance among the N images is extracted, and the target image of the object to be shot is obtained according to the target feature. In this way, display condition (e.g., including a profile condition, a light intensity condition, and a color information) of the target image is more advantageous than display condition of any one of the N images, and shooting performance of the display device is improved.

DETAILED DESCRIPTION OF THE EMBODIMENTS

A current terminal product requires a photosensitive module like a camera to be placed under a screen body. The screen body has a substrate, and a current substrate of the screen body, however, is made of yellow polyimide (PI) that has low transmittance. In response to the photosensitive module like the camera acquiring an external optical signal, a screen is not able to ensure sufficient light transmitted through the screen body. This renders that the photosensitive module like the camera is not able to acquire sufficient light, and shooting performance of the photosensitive module like the camera is impacted.

In view of the problem, the present disclosure provides an image acquisition method and an image acquisition system and a display panel. An acquisition device of the image acquisition system acquires N images of an object to be shot by N shooting devices. In this way, a light acquisition region of a display device is enlarged and is able to acquire all light entering a photosensitive region of each shooting device of the shooting devices. An extraction device of the image acquisition system may further be able to extract M/N target features from M features of the N images, and a processing device of the image acquisition system is able to acquire a target image according to the M/N target features, herein the M/N target features have optimal performance among M features of the N images. In this way, shooting performance of the display device is improved.

The embodiments of the present disclosure will be described in detail below with reference to the accompanying drawings in order to make the objectives, technical solutions and advantages of the present invention clearer. However, it will be apparent to those skilled in the art that, in the various embodiments of the present invention, numerous technical details are set forth in order to provide the reader with a better understanding of the present disclosure. However, the technical solutions claimed in the present disclosure can be implemented without these technical details and various changes and modifications based on the following embodiments.

Figure 1:
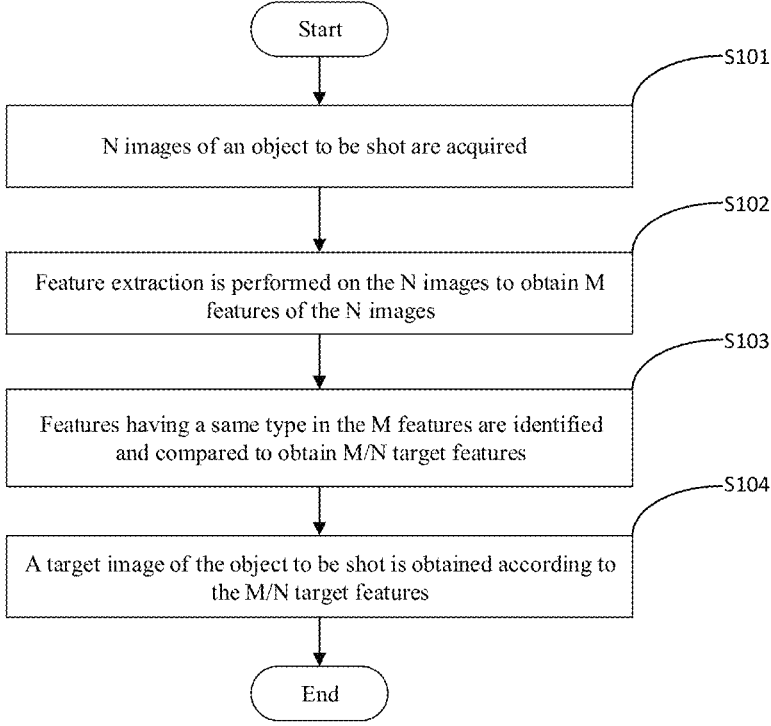
FIG. 1 is a flow chart of an image acquisition method in accordance with an embodiment of the present disclosure.

An embodiment of the present disclosure provides an image acquisition method. A flow chart of the image acquisition method is shown in FIG. 1, including the following operations.

In S101, N images of an object to be shot are acquired.

In particular, N is an integer greater than 1. The N images are shot by N shooting devices. The N images correspond to the N shooting devices on a one-to-one basis. It may be understood that a value of N is not specifically defined in this embodiment. N being 3 is taken as an example. N shooting devices include a first shooting device, a second shooting device and a third shooting device. The first shooting device, the second shooting device, and the third shooting device have varied shooting fields of view. The N images include a first image shot by the first shooting device, a second image shot by the second shooting device and a third image shot by the third shooting device.

Figure 2:
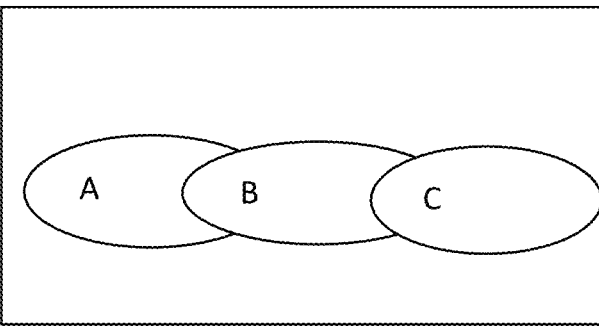
FIG. 2 is a shooting image of a shooting device in accordance with an embodiment of the present disclosure.

It shall be noted that as shown in FIG. 2, A denotes the first image shot by the first shooting device, B denotes the second image shot by the second shooting device, and C denotes the third image shot by the third shooting device. Because all shooting fields of view shot by the shooting devices vary, a superimposed information between two images among the N images is limited. In addition, in order to make information of each image of the N images relatively independent, arrangement of the N shooting devices is defined in terms of position, according to shooting fields of view of the N shooting devices, so as to ensure that the superimposed information is as less as possible.

In S102, feature extraction is performed on the N images to obtain M features of the N images.

In some embodiments, each of the N images has a plurality of features, and types of the plurality of features are different from each other. In some embodiments, the plurality of features may include profile information, light intensity information, color information, or the like.

In some embodiments, M is an integer multiple of N, and the M features include M/N types of features. In some embodiment, each of the N images has the same number of types of features, for example, each of the N images includes M/N types of features.

As an example, N is taken as 3. The 3 images include a first image, a second image and a third image. Feature extraction is performed on the first image, the second image and the third image, respectively, to obtain M/3 first features of the first image, M/3 second features of the second image and M/3 third features of the third image.

As an example, N is taken as 3 and M is taken as 9. The 3 images include a first image, a second image and a third image. Feature extraction is performed on the first image, the second image and the third image, respectively, to obtain 3 first features of the first image, 3 second features of the second image and 3 third features of the third image.

In some embodiments, the first features include first profile information, first light intensity information and first color information, the second features include second profile information, second light intensity information and second color information, and the third features include third profile information, third light intensity information and third color information.

The first profile information, the second profile information, and the third profile information belong to the same type of features. The first light intensity information, the second light intensity information, and the third light intensity information belong to the same type of features. The first color information, the second color information and the third color information belong to the same type of features.

It shall be noted that in order to improve shooting performance of the display device, each image of the N images is preprocessed to denoise noise data of each image respectively before performing feature extraction on the N images. In particular, each image of the N images is preprocessed by the following way. First, noise data of each image of the N images is removed by a mean filter and a Gaussian filter; and Next, threshold segmentation is performed on each image of the N images by using an adaptive threshold segmentation algorithm. Because a grey scale of the N images is affected by distribution of light, a partial threshold segmentation algorithm of the adaptive threshold segmentation algorithm is applied to segment a foreground and a background of each image of the N images, so as to facilitate analysis and feature (e.g., edge information and position feature of the N images) extraction on the N images.

In S103, features having a same type in the M features are identified and compared to obtain M/N target features.

That is, the number of the target features is the same as the number of types of the M features. In some embodiments, types of the M/N target features are different from each other, and one target feature is obtained with respect to one type of features in the M features.

In some embodiments, a feature having greater performance in a respective same type of features is selected as the target feature. As an example, when N is taken as 3 and M is taken as 9, the M features includes three types of features, and the feature having greater performance in the respective type of features is selected as the target feature, i.e., three target features are obtained.

In some embodiments, the performance may be profile performance, light intensity performance, color performance, or the like.

In S104, a target image of the object to be shot is obtained according to the M/N target features.

In some embodiments, the target image of the object to be shot may be obtained in the following manner. Information clustering is performed on the M/N target features respectively, and a plurality of sub-images are generated according to a result of the information clustering. Image stitching is performed on the plurality of sub-images to obtain a stitched image, and the stitched image is taken as the target image. Further, in this embodiment, information clustering may be performed on the M/N target features through a K-means clustering algorithm, such as to perform information clustering on a texture feature (corresponding to profile information), a grey scale feature (corresponding to light intensity information) and a corner feature (corresponding to color information). As an example, the texture feature includes the first profile information, the second profile information, and the third profile information, the grey scale feature includes the first light intensity information, the second light intensity information, and the third light intensity information, and the corner feature includes the first color information, the second color information, and the third color information.

It shall be noted that after clustered images are stitched into one image containing richer information, there would be a condition of obvious chromatic aberration and uneven grey distribution at a stitching edge of the stitched image. Therefore, in order to further improve display quality of the target image, after a stitched image is obtained, a fusion processing may be performed on the stitched image, and the stitched image after the fusion processing is taken as the target image. It may be understood that in this embodiment, a weighted average method may be applied to processing pixels of a superimposed portion to avoid obvious chromatic aberration of the image and uneven grey distribution.

In some embodiments, information clustering is performed on at least two features of a respective type of the M/N types to obtain a clustered feature, and the clustered feature is taken as a target feature. The way for obtaining the clustered feature is as follow. Each of the at least two features has a weight value, each feature is multiplied by its own weight value to obtain a respective weighted feature, and then these weighted features are added together to obtain the clustered feature.

The number of the plurality of sub-images is N. The N sub-images are in one-to-one correspondence with the N images.

In some embodiments, a plurality of sub-images are generated according to a result of the clustering by a following method, i.e., applying the M/N target features in each of the N images to obtain a respective sub-image corresponding to each of the N images.

In existing technologies, a single shooting device is used to shoot an image and a light acquisition region of the single shooting device is small. This can by no means ensure acquisition of light satisfying shooting requirement of the shooting device, resulting in undesirable final images obtained through shooting. In some embodiments of the present disclosure, compared with the existing technologies, N images of an object to be shot are acquired, the N images shot by means of N shooting devices. The N shooting devices are all provided in a shooting region of the display device, so that the light acquisition region of the display device is larger. In this way, a condition is avoided where a small light acquisition region results in impacted image condition of the target image subsequently obtained. Besides, features having a same type of features are identified and compared among the M features to obtain M/N target features, the M features including M/N types of features. That is, a target feature (a number of target features of each type of features is 1) having optimal performance among the N images is extracted, and the target image of the object to be shot is obtained according to the target feature. In this way, display condition of the target image is more advantageous than display condition of any one of the N images, and shooting performance of the display device is improved.

An embodiment of the present disclosure relates to an image acquisition method. This embodiment provides further examples to describe the aforementioned embodiment by specifically describing a method for obtaining the M/N target features.

Figure 3:
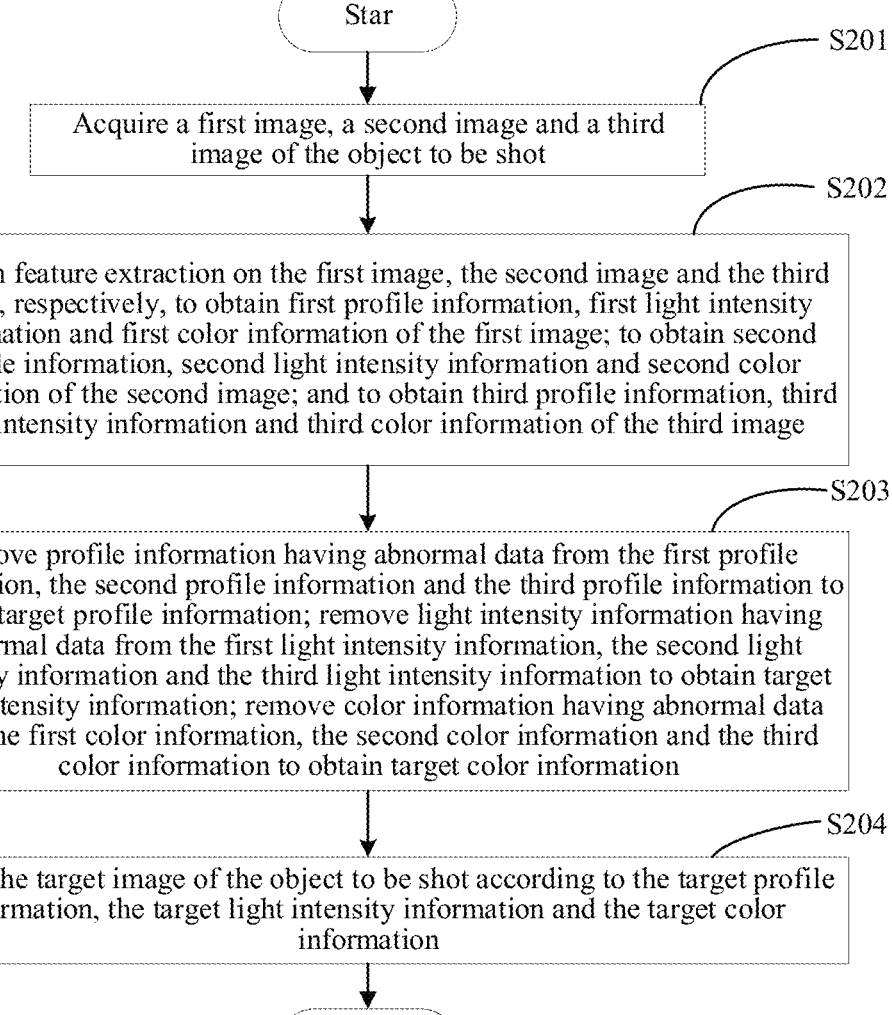
FIG. 3 is a flow chart of an image acquisition method in accordance with an embodiment of the present disclosure.

A flow chart of this embodiment is shown in FIG. 3, including the following operations.

In S201, a first image, a second image and a third image of the object to be shot are acquired.

In S202, feature extraction is performed on the first image, the second image and the third image, respectively, to obtain first profile information, first light intensity information and first color information of the first image; to obtain second profile information, second light intensity information and second color information of the second image; and to obtain third profile information, third light intensity information and third color information of the third image.

In some embodiments, the profile information is represented by a set of first data, the light intensity information is represented by a set of second data, and the color information is represented by a set of third data.

In S203, profile information having abnormal data is removed from the first profile information, the second profile information and the third profile information to obtain target profile information. Light intensity information having abnormal data is removed from the first light intensity information, the second light intensity information and the third light intensity information to obtain target light intensity information. Color information having abnormal data is removed from the first color information, the second color information and the third color information to obtain target color information.

In some embodiments, the profile information having abnormal data may be the first profile information, the second profile information or the third profile information. The light intensity information having abnormal data may be the first light intensity information, the second light intensity information and the third light intensity information. The color information having abnormal data may be the first color information, the second color information and the third color information.

In some embodiments, profile information having abnormal data is removed from the first profile information, the second profile information and the third profile information, and remaining profile information is left. The target profile information is obtained based on the remaining profile. In some embodiments, the first profile information has abnormal data, then the first profile information is removed, and the target profile information is obtained based on the second profile information and the third profile information. In some embodiments, both of the first profile information and the second profile information have abnormal data, then the first profile information and the second profile information are removed, and the target profile information is obtained based on the third profile information, i.e., the third profile information is the target profile information.

In some embodiments, light intensity information having abnormal data is removed from the first light intensity information, the second light intensity information and the third light intensity information, and remaining light intensity information is left. The target light intensity information is obtained based the remaining light intensity information. In some embodiments, the second light intensity information has abnormal data, then the second light intensity information is removed, and the target light intensity information is obtained based on the first light intensity information and the third light intensity information. In another embodiment, both of the second light intensity information and the third light intensity information have abnormal data, then the second light intensity information and the third light intensity information are removed, and the target light intensity information is obtained based on the first light intensity information, i.e., the first light intensity information is the target light intensity information.

In some embodiments, color information having abnormal data is removed from the first color information, the second color information and the third color information, and remaining color information is left. The target color information is obtained based the remaining color information. In some embodiments, the third color information has abnormal data, then the third color information is removed, and the target color information is obtained based on the first color information and the second color information. In some embodiments, both of the first color information and the third color information have abnormal data, then the first color information and the third color information are removed, and the target color information is obtained based on the second color information, i.e., the second color information is the target color information.

In S204, the target image of the object to be shot is obtained according to the target profile information, the target light intensity information and the target color information.

In existing technologies, a single shooting device is used to shoot an image and a light acquisition region of the single shooting device is small. This can by no means ensure acquisition of light satisfying shooting requirement of the shooting device, resulting in undesirable final images obtained through shooting. In some embodiments of the present disclosure, compared with the existing technologies, N images of an object to be shot are acquired, the N images shot by means of N shooting devices. The N shooting devices are all provided in a shooting region of the display device, so that the light acquisition region of the display device is larger. In this way, a condition is avoided where a small light acquisition region results in impacted image condition of the target image subsequently obtained. Besides, features having a same type of features are identified and compared among the M features to obtain M/N target features, the M features including M/N types of features. That is, a target feature (a number of target features of each type of features is 1) having optimal performance among the N images is extracted, and the target image of the object to be shot is obtained according to the target feature. In this way, display condition of the target image is more advantageous than display condition of any one of the N images, and shooting performance of the display device is improved.

An embodiment of the present disclosure relates to an image acquisition method. This embodiment provides further examples to describe the aforementioned embodiment by specifically describing a method for obtaining the M/N target features.

Figure 4:
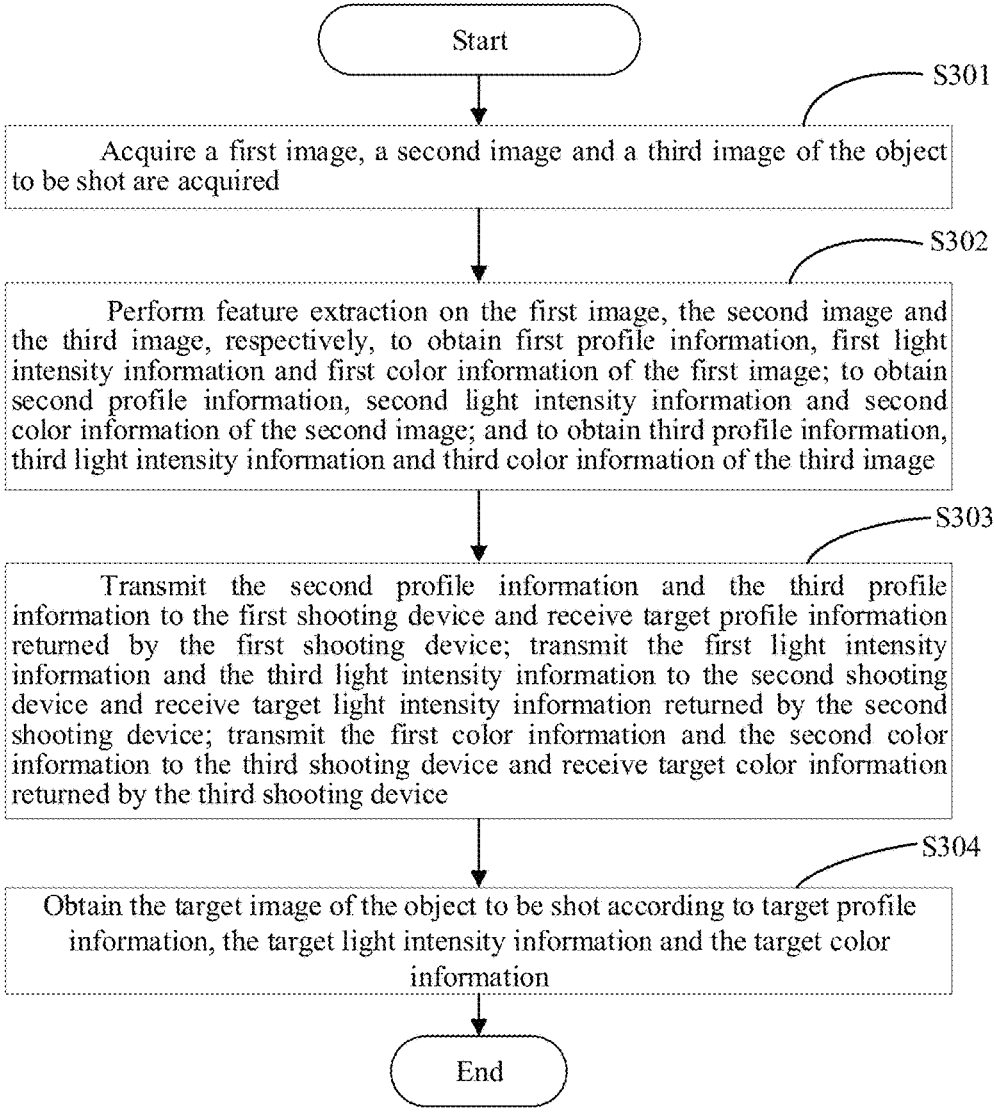
FIG. 4 is a flow chart of an image acquisition method in accordance with another embodiment of the present disclosure.

A specific flow of this embodiment is shown in FIG. 4, including the following operations.

In S301, a first image, a second image and a third image of the object to be shot are acquired.

In some embodiments, the first image is acquired by a first shooting device, the second image is acquired by a second shooting device, and the third image is acquired. In some embodiments, the first shooting device is configured to acquire the first image having prime profile information, the second shooting device is configured to acquire the second image having prime light intensity information, and the third shooting device is configured to acquire the third image having prime color information.

In some embodiments, the capability in processing profile information of the first shooting device is better than capability in processing profile information of the second shooting device and the third shooting device. The capability in processing light intensity information of the second shooting device is better than capability in processing light intensity information of the first shooting device and the third shooting device. The capability in processing color information of the third shooting device is better than capability in processing color information of the first shooting device and the second shooting device.

In S302, feature extraction is performed on the first image, the second image and the third image, respectively, to obtain first profile information, first light intensity information and first color information of the first image; to obtain second profile information, second light intensity information and second color information of the second image; and to obtain third profile information, third light intensity information and third color information of the third image.

In S303, the second profile information and the third profile information are transmitted to the first shooting device. Target profile information returned by the first shooting device is received. The first light intensity information and the third light intensity information are transmitted to the second shooting device. Target light intensity information returned by the second shooting device is received. The first color information and the second color information are transmitted to the third shooting device. Target color information returned by the third shooting device is received.

In some embodiments, the M/N target features include the target profile information, the target light intensity information, and the target color information.

The first shooting device receives the second profile information and the third profile information, and then the first shooting device include the first profile information, the second profile information, and the third profile information, so as to obtain a first result. The target profile information is obtained according to the first result after the first shooing device identifying and comparing the first profile information, the second profile information and the third profile information.

In some embodiments, the first result is obtained by the following method. The first profile information has a first profile weight value, the second profile information has a second profile weight value, and the third profile information has a third profile weight value; the first profile information is multiplied by the first profile weight value, to obtain a first weighed profile information. The second profile information is multiplied by the second profile weight value, to obtain a second weighed profile information; the third profile information is multiplied by the third profile weight value, to obtain a third weighed profile information; then, obtain the target profile information by adding the first weighed profile information, the second weighed profile information, and the third weighed profile information together.

The second shooting device receives the first light intensity information and the third light intensity information, and then the second shooting device compares the first light intensity information, the second light intensity information, and the third light intensity information, such that to obtain a second result. The target light intensity information is obtained according to the second result after the second shooing device identifying and comparing the first light intensity information, the second light intensity information and the third light intensity information.

In some embodiments, the second result is obtained by the following method. The first light intensity information has a first light intensity weight value, the second light intensity information has a second light intensity weight value, and the third light intensity information has a third light intensity weight value; the first light intensity information is multiplied by the first light intensity weight value, to obtain a first weighed light intensity information. The second light intensity information is multiplied by the second light intensity weight value, to obtain a second weighed light intensity information; the third light intensity information is multiplied by the third light intensity weight value, to obtain a third weighed light intensity information; then, obtain the target light intensity information by adding the first weighed light intensity information, the second weighed light intensity information, and the third weighed light intensity information together.

The third shooting device receives the first color information and the second color information, and then the third shooting devices compares the first color information, the second color information, and the third color information, such that to obtain a third result. The target color information is obtained according to a result after the third shooing device identifying and comparing the first color information, the second color information and the third color information.

In some embodiments, the third result is obtained by the following method. The first color information has a first color weight value, the second color information has a second color weight value, and the third color information has a third color weight value; the first color information is multiplied by the first color weight value, to obtain a first weighed color information. The second color information is multiplied by the second color weight value, to obtain a second weighed color information; the third color information is multiplied by the third color weight value, to obtain a third weighed color information; then, obtain the target color information by adding the first weighed color information, the second weighed color information, and the third weighed color information together.

In particular, before shooting the object to be shot, functions of the first shooting device, the second shooting device and the third shooting device may be adjusted. For example, the first shooting device is adjusted to realize the following function: a prime feature of the first image is a profile information. The second shooting device is adjusted to realize the following function: a prime feature of the second image is a light intensity information. And the third shooting device is adjusted to realize the following function: a prime feature of the third image is a color information. Besides, because each shooting device of the N shooting devices has a limited shooting field of view (each shooting device has a shooting field of view smaller than a total shooting field of view that may be shot by an entire shooting region), image information of each image (i.e., the first image, the second image, the third image) acquired by each shooting device of the N shooting devices is uncomplete. After of the N shooting devices acquire the N images, each image of the N images includes multiple types of image information, and image information of the same type among the N images is transmitted to a shooting device having better capability in processing the image information (for example, the second profile information and the third profile information are transmitted to the first shooting device having better capability in processing profile information). This may ensure that image information finally obtained is complete and accurate, and further improves a shooting result of the display device.

In some embodiments, the image information includes profile information, light intensity information and color information.

In S304, the target image of the object to be shot is obtained according to target profile information, the target light intensity information and the target color information.

In response to a single shooting device being used to shoot an image, a light acquisition region of the single shooting device is small. This can by no means ensure acquisition of light satisfying shooting requirement of the shooting device, resulting in undesirable final images obtained through shooting. In some embodiments of the present disclosure, however, N images of an object to be shot are acquired, the N images shot by means of N shooting devices. The N shooting devices are all provided in a shooting region of the display device, so that the light acquisition region of the display device is larger. In this way, a condition is avoided where a small light acquisition region results in impacted image condition of the target image subsequently obtained. Besides, features having a same type are identified and compared among the M features to obtain M/N target features, the M features including M/N types of features. That is, a target feature (a number of target features of each type of features is 1) having optimal performance among the N images is extracted, and the target image of the object to be shot is obtained according to the target feature. In this way, display condition of the target image is more advantageous than display condition of any one of the N images, and shooting performance of the display device is improved.

Figure 5:
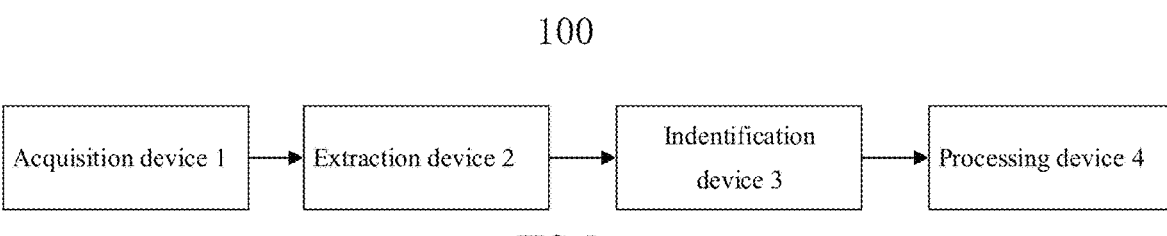
FIG. 5 is a structural diagram of an image acquisition system in accordance with an embodiment of the present disclosure.

An embodiment of the present disclosure relates to an image acquisition system 100. As shown in FIG. 5, the image acquisition system 100 includes an acquisition device 1, an extraction device 2, an identification device 3 and a processing device 4. The acquisition device 1 is configured to acquire N images. N is an integer greater than 1. The N images are shot by N shooting devices. Shooting fields of view of the N shooting devices are all different, and the N images correspond to the N shooting devices on a one-to-one basis. The extraction device 2 is configured to perform feature extraction on the N images to obtain M features of the N images. M is an integer multiple of N. The M features include M/N types of features. The identification device 3 is configured to identify and compare features of the same type among the M features to obtain M/N target features. The types of features of the M/N target features are all different. The processing device 4 is configured to obtain a target image of the object to be shot according to the M/N target features.

It is easy to notice that this embodiment is a device embodiment corresponding to the aforementioned method embodiment. This embodiment may be implemented in combination with the method embodiment. Technical details referred to in the method embodiment work in this embodiment and thus are not repeated here to avoid duplication. Correspondingly, related technical details in this embodiment are applicable to the method embodiment.

Figure 6:
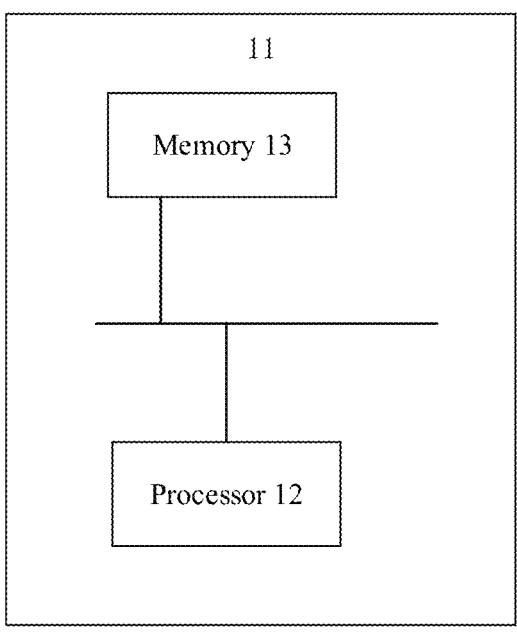
FIG. 6 is a structural diagram of a display panel in accordance with an embodiment of the present disclosure.

An embodiment of the present disclosure relates to a display panel 200. As shown in FIG. 6, the display panel 200 includes a screen body 11, at least one processor 12 provided within the screen body 11, and a memory 13 in communication connection with the at least one processor 12. The memory 13 stores an instruction executable by the at least one processor 12. The instruction is executed by the at least one processor 12, so that the least one processor is able to execute the aforementioned image acquisition method.

Herein, the memory 13 and the at least one processor 12 are connected in a bus manner. The bus may include interconnected buses and bridges of any number. The bus connects varied types of circuits of the at least one processor 12 and the memory 13. The bus may further connect varied types of other circuits such as circuits of a peripheral device, a regulator and a power management circuit. These are common knowledge in the existing technologies. Therefore, these are not further described. A bus interface provides an interface between the bus and a transceiver. The transceiver may be an element or more elements such as a plurality of receivers and transmitters to provide units for communicating with other devices on a transmission medium. Data processed by a processor 12 is transmitted through an antenna on a wireless medium. Further, the antenna receives data and transmits the data to the processor 12.

The processor 12 is responsible for managing the bus and general processing, and may provide various functions including control functions such as timing, voltage adjustment of a peripheral interface and power supply management. The memory 13 may be applied to storing data used by the processor 12 upon executing operations.

Those skilled in the art should appreciate that the aforementioned embodiments are specific embodiments for implementing the present invention. In practice, however, many changes can be made in the forms and details of the specific embodiments without departing from the spirit and scope of the present disclosure. Any one skilled in the art may make changes and amendment within the spirit and scope of the present disclosure. Therefore, the protection scope of the present disclosure shall be subject to the scope defined by the claims.

What is claimed is:

1. An image acquisition method, comprising:
acquiring N images of an object to be shot, wherein N is an integer greater than 1, the N images are shot by N shooting devices, shooting fields of view of the N shooting devices are different from each other, and the N images are in one-to-one correspondence with the N shooting devices;
performing feature extraction on the N images to obtain M features of the N images, wherein M is an integer multiple of N, and the M features comprise M/N types of features;
identifying and comparing features having a same type in the M features to obtain M/N target features, wherein types of the M/N target features are different from each other; and
obtaining a target image of the object to be shot according to the M/N target features;
wherein the N shooting devices at least comprise a first shooting device, a second shooting device and a third shooting device, the N images at least comprise a first image shot by the first shooting device, a second image shot by the second shooting device and a third image shot by the third shooting device, and performing feature extraction on the N images to obtain M features of the N images comprises:
performing feature extraction on the first image, the second image and the third image, respectively, to obtain first features of the first image, second features of the second image and third features of the third image;
wherein the first features comprise first profile information, first light intensity information and first color information;
the second features comprise second profile information, second light intensity information and second color information; and
the third features comprise third profile information, third light intensity information and third color information;
wherein identifying and comparing features having the same type in the M features to obtain the M/N target features comprises:
transmitting the second profile information and the third profile information to the first shooting device, and receiving target profile information returned by the first shooting device, the target profile information obtained according to a first result after the first shooing device identifying and comparing the first profile information, the second profile information and the third profile information;
transmitting the first light intensity information and the third light intensity information to the second shooting device, and receiving target light intensity information returned by the second shooting device, the target light intensity information obtained according to a second result after the second shooing device identifying and comparing the first light intensity information, the second light intensity information and the third light intensity information; and
transmitting the first color information and the second color information to the third shooting device, receiving target color information returned by the third shooting device, and the target color information obtained according to a third result after the third shooing device identifying and comparing the first color information, the second color information and the third color information,
wherein the first profile information includes at least a texture feature;
the first light intensity information includes at least a grey scale feature; and
the first color information includes at least a corner feature.

2. The image acquisition method according to claim 1, wherein identifying and comparing features having the same type in the M features to obtain the M/N target features comprises:
removing profile information having abnormal data from the first profile information, the second profile information and the third profile information to obtain target profile information;
removing light intensity information having abnormal data from the first light intensity information, the second light intensity information and the third light intensity information to obtain target light intensity information; and removing color information having abnormal data from the first color information, the second color information and the third color information to obtain target color information.

3. The image acquisition method according to claim 1, further comprising:

before performing the feature extraction on the N images, preprocessing the N images to denoise noise data of the N images.

4. The image acquisition method according to claim 3, wherein preprocessing the N images comprises:

removing the noise data of each image of the N images by using a mean filter and a Gaussian filter; and performing threshold segmentation on each image of the N images by using an adaptive threshold segmentation algorithm.

5. The image acquisition method according to claim 1, wherein obtaining the target image of the object to be shot according to the M/N target features comprises:

performing information clustering on the M/N target features, and generating a plurality of sub-images according to a result of the information clustering; and performing image stitching on the plurality of sub-images to obtain a stitched image, and taking the stitched image as the target image.

6. The image acquisition method according to claim 5, wherein performing the information clustering on the M/N target features comprises:

performing clustering on the M/N target features through a K-means clustering algorithm.

7. The image acquisition method according to claim 5, further comprising:

after the stitched image is obtained, performing a fusion processing on the stitched image, and taking the stitched image after the fusion processing as the target image.

8. The image acquisition method according to claim 7, further comprising:

before taking the stitched image after the fusion processing as the target image, processing pixels of a superimposed portion of the image after the fusion processing by using a weighted average method.

9. An image acquisition system, comprising: an acquisition device, an extraction device, an identification device and a processing device;

the acquisition device configured to acquire N images, wherein N is an integer greater than 1, the N images are shot by N shooting devices, shooting fields of view of the N shooting devices are different from each other, and the N images are in one-to-one correspondence with the N shooting devices;

the extraction device configured to perform feature extraction on the N images to obtain M features of the N images, wherein M is an integer multiple of N, and the M features include M/N types of features;

the identification device configured to identify and compare features having a same type in the M features to obtain M/N target features, wherein types of the M/N target features are different from each other; and the processing device configured to obtain a target image of the object to be shot according to the M/N target features;

wherein the N shooting devices at least comprise a first shooting device, a second shooting device and a third shooting device, the N images at least comprise a first image shot by the first shooting device, a second image shot by the second shooting device and a third image shot by the third shooting device, and performing feature extraction on the N images to obtain M features of the N images comprises:

performing feature extraction on the first image, the second image and the third image, respectively, to obtain first features of the first image, second features of the second image and third features of the third image;

wherein the first features comprise first profile information, first light intensity information and first color information;

the second features comprise second profile information, second light intensity information and second color information; and the third features comprise third profile information, third light intensity information and third color information;

wherein identifying and comparing features having the same type in the M features to obtain the M/N target features comprises:

transmitting the second profile information and the third profile information to the first shooting device, and receiving target profile information returned by the first shooting device, the target profile information obtained according to a first result after the first shooing device identifying and comparing the first profile information, the second profile information and the third profile information;

transmitting the first light intensity information and the third light intensity information to the second shooting device, and receiving target light intensity information returned by the second shooting device, the target light intensity information obtained according to a second result after the second shooing device identifying and comparing the first light intensity information, the second light intensity information and the third light intensity information; and transmitting the first color information and the second color information to the third shooting device, receiving target color information returned by the third shooting device, and the target color information obtained according to a third result after the third shooing device identifying and comparing the first color information, the second color information and the third color information, wherein the first profile information includes at least a texture feature;

the first light intensity information includes at least a grey scale feature; and the first color information includes at least a corner feature.

10. A display panel, comprising a screen body, at least one processor provided within the screen body, and a memory in communication connection with the at least one processor;

the memory storing an instruction executable by the at least one processor, so that the least one processor is able to execute an image acquisition method according to claim 1.

* * * * *